March 5, 1940. S. A. SNELL 2,192,535
METHOD OF MAKING JUVENILE VEHICLE BODIES
Filed March 14, 1938 3 Sheets-Sheet 1
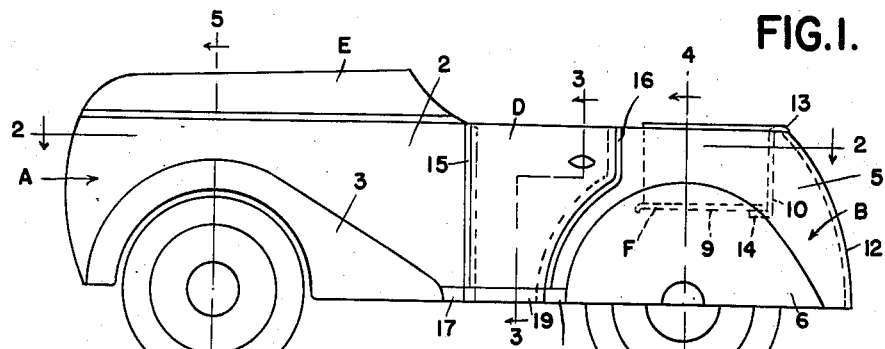
FIG.1.
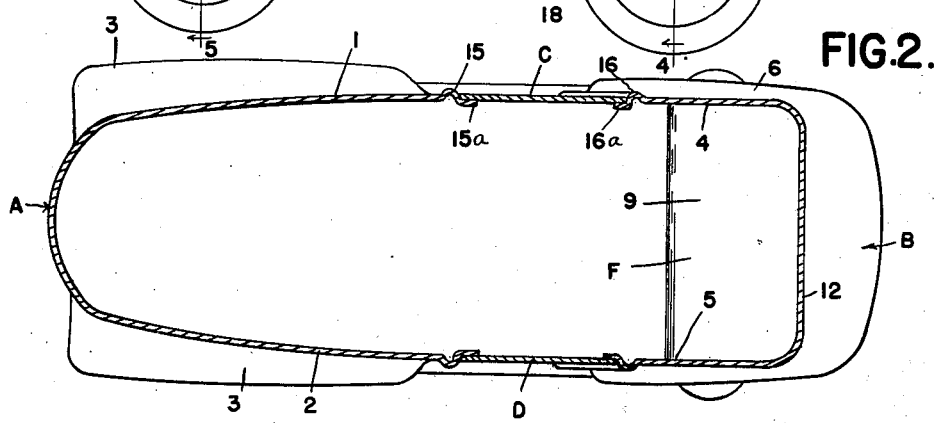
FIG.2.
FIG.5. FIG.3. FIG.4.
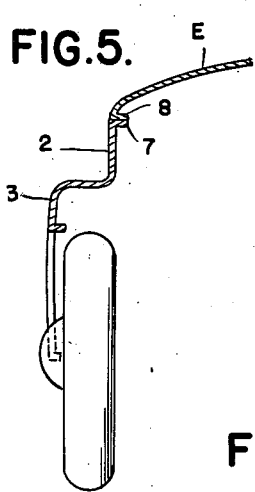 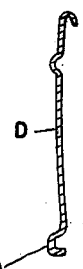 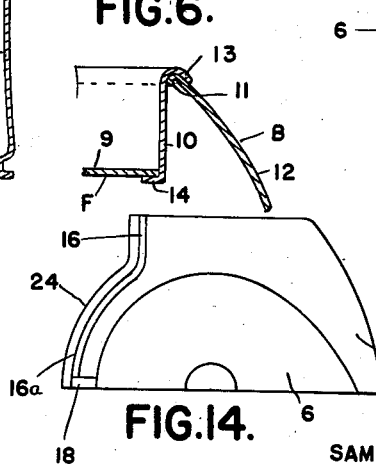
FIG.6.
FIG.16.
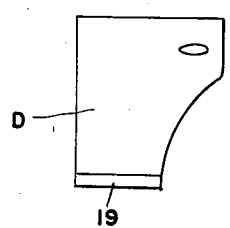
FIG.14.
INVENTOR
SAMUEL A. SNELL
BY
ATTORNEYS March 5, 1940.                 S. A. SNELL                 2,192,535
METHOD OF MAKING JUVENILE VEHICLE BODIES
Filed March 14, 1938              3 Sheets-Sheet 2

INVENTOR
SAMUEL A. SNELL
BY
*Whittemore, Hulbert & Belknap*
ATTORNEYS

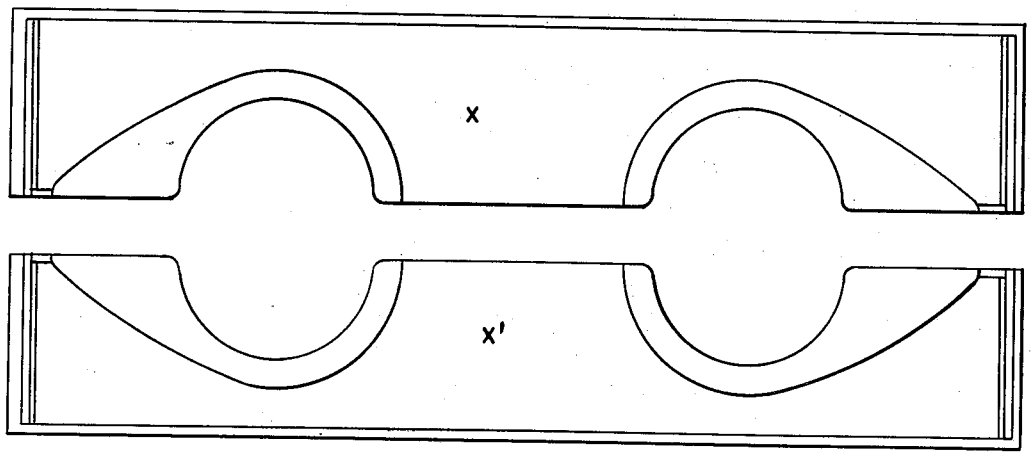
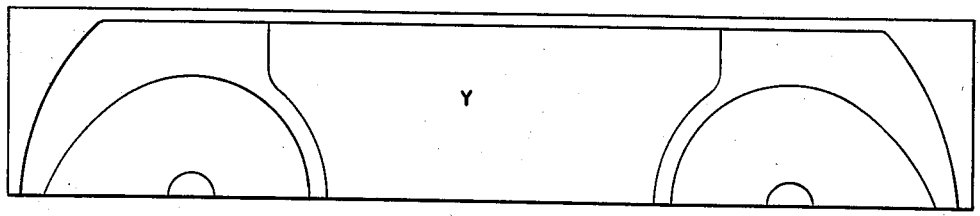
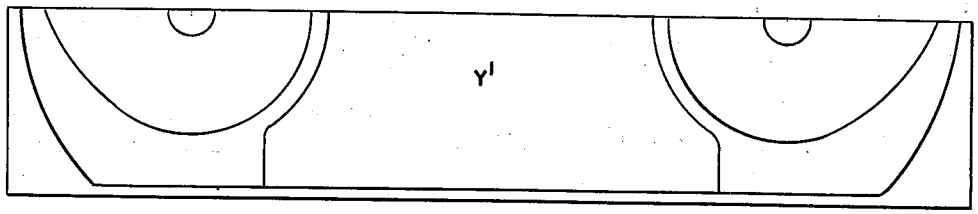
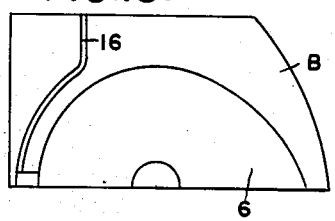
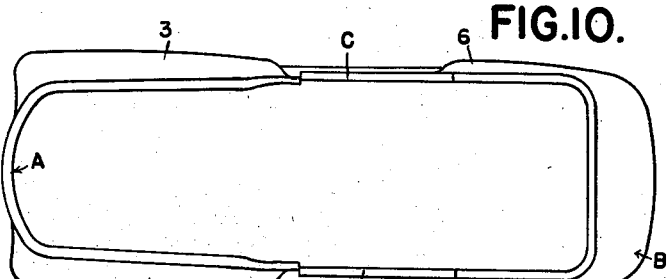
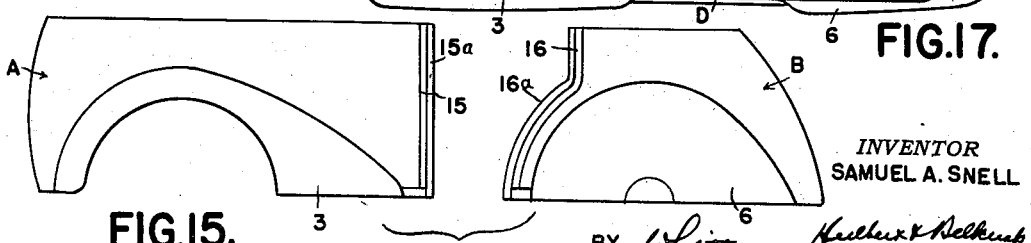

Patented Mar. 5, 1940

2,192,535

UNITED STATES PATENT OFFICE 2,192,535

METHOD OF MAKING JUVENILE VEHICLE BODIES

Samuel A. Snell, Toledo, Ohio, assignor to The American-National Company, Toledo, Ohio, a corporation of Ohio Application March 14, 1938, Serial No. 195,874

7 Claims. (Cl. 113—116)

This invention relates generally to a method of making pressed metal juvenile vehicle bodies of the type in which a child rides and is a continuation in part of my application filed March 15, 1937, bearing Serial No. 131,101, now Patent #2,145,896.

One of the essential objects of the invention is to improve the method of making vehicle bodies of the type mentioned so that various lengths of any given style thereof may be manufactured by the use of any one set of dies.

Another object is to make the vehicle bodies in such a way from comparatively light weight sheet metal that they will be economical to manufacture and will effectively withstand the strains and stresses to which they are subjected while in use.

Another object is to make the vehicle bodies in such a way that the over-all number of stampings required to accomplish the results desired is reduced to a minimum.

Another object is to form two front end portions of the vehicle body from one sheet of metal and to form two rear end portions from another sheet of metal so that a material saving in time and labor for making such end portions is effected.

Other objects, advantages and novel details of construction of this invention will be made more apparent as this description proceeds, especially when considered in connection with the accompanying drawings, wherein:

Figure 1 is a side elevation of a juvenile vehicle body embodying my invention;

Figure 2 is a sectional view taken substantially on the line 2—2 of Figure 1;

Figure 3 is a sectional view taken substantially on the line 3—3 of Figure 1;

Figure 4 is a sectional view taken substantially on the line 4—4 of Figure 1;

Figure 5 is a sectional view taken substantially on the line 5—5 of Figure 1;

Figure 6 is a vertical longitudinal section through the seat and rear deck;

Figure 9 shows the sheet illustrated in Figure 7 after it has been cut along line 22;

Figure 10 shows the sheet illustrated in Figure 8 after it has been cut along line 23;

Figure 13 shows a side elevation of one of the rear end portions before being trimmed;

Figure 14 is a view similar to Figure 13 after the rear end portion has been trimmed at its forward end to provide the edges 24;

Figure 15 is a side elevation of a front end portion and a rear end portion spaced apart prior to the attachment thereto of intermediate portions;

Figure 16 is a side elevation of one of the intermediate portions;

Figure 17 is a top plan view of the assembled front, rear and intermediate portions before the hood and seat stampings are attached thereto.

Figure 7:
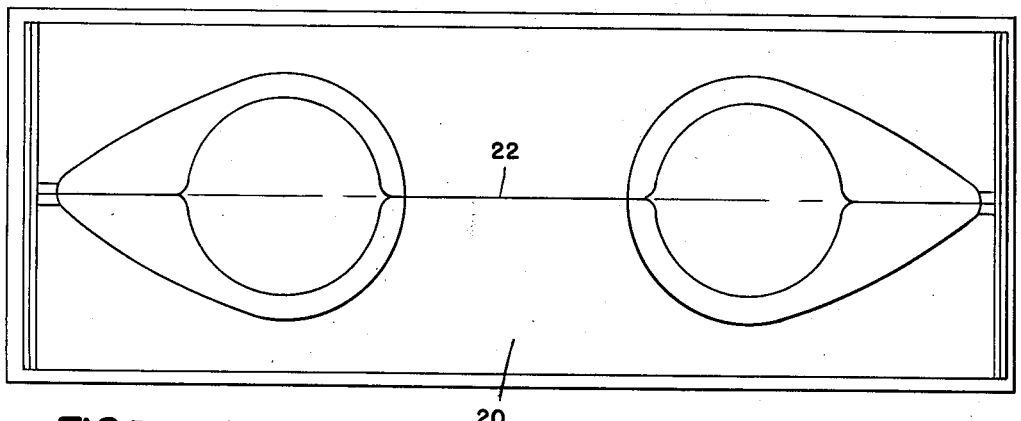
Figure 7 shows a top plan view of a sheet of metal after it has been pressed by suitable dies to form impressions of two juvenile vehicle body front end portions.
Figure 8:
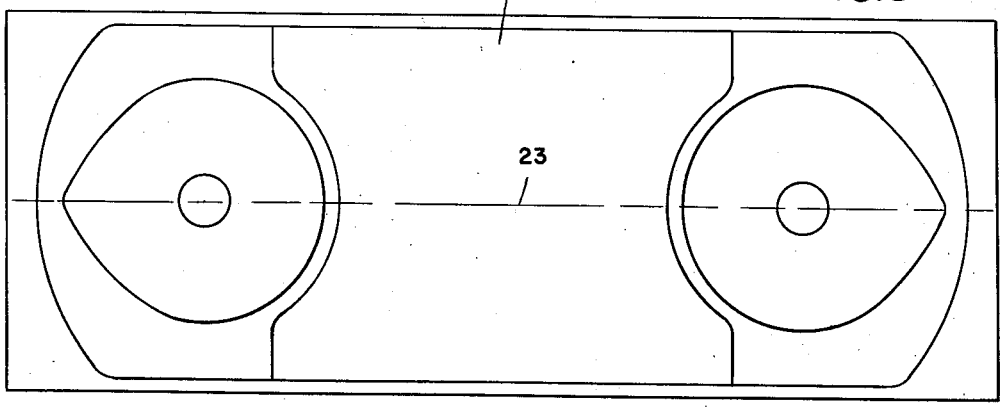
Figure 8 shows a top plan view of a sheet of metal after it has been pressed by suitable dies to form impressions of two juvenile vehicle body rear end portions.

Referring now to the drawings, A is the front section, B is the rear section, and C and D, respectively, are the intermediate sections of a juvenile vehicle body embodying my invention.

As shown, the front section A is substantially U-shape in plan and forms the front end of the body. The rear section B is likewise substantially U-shape in plan and forms the rear end of the body. The intermediate sections C and D each simulate doors and are rigidly secured, preferably by welding, in overlapping relation to the contiguous end portions of said front and rear sections A and B.

Preferably opposite sides 1 and 2, respectively, of the front section A have outwardly bulging portions 3 forming fenders for the front wheels of the vehicle. Likewise, opposite sides 4 and 5, respectively, of the rear section B have outwardly bulging portions 6 forming fenders for the rear wheels of the vehicle. At the upper edges of the sides 1 and 2 of the front section A are inturned flanges 7 to which similar flanges 8 of a suitable hood E are secured.

At the rear end of the body is a seat F formed of stampings 9 and 10 which are supported from inturned flanges 11 at the upper edges of the side and rear portions 4, 5 and 12, respectively, of the rear section B. Preferably the seat stamping 9 extends substantially horizontal between and is free of the side portions 4 and 5 of the rear section, while the upright stampings 10 of the seat have flanges 13 overlying and secured to the inturned flanges 11 and have flanges 14 underlying and secured to the seat stamping 9.

To provide a pleasing appearance and to insure a strong and durable construction, the side portions 1, 2, 4 and 5, respectively, of the front and rear sections A and B are provided adjacent their opposed edges with outwardly embossed strip-like portions 15 and 16, respectively, that form frame-like abutments for the contiguous edges of the intermediate sections C and D.

To further stiffen and reinforce the structure, the side portions 1 and 2 of the front section are provided at their lower edges in rear of the fenders 3 with inwardly opening channels 17, the side portions 4 and 5 of the rear section B are provided at their lower edges in advance of the fenders 6 with inwardly opening channels 18, and the intermediate sections C and D are provided at their lower edges with inwardly opening channels 19. As shown, the ends of the channels 19 of the intermediate sections are secured in overlapping relation to the adjacent ends of the channels 17 and 18 and cooperate with each other to provide a strong and durable structure.

In the process of construction the front and rear sections A and B are formed separately from sheet metal and are spaced apart the proper distance to receive therebetween the intermediate sections C and D. These intermediate sections C and D are also formed separately from sheet metal and are welded to the side portions 1, 2, 4 and 5, respectively of the front and rear sections to form an elongated shell. The hood E and seat stampings 9 and 10 are then welded to the shell as shown to complete the body structure. By spacing the front and rear sections A and B farther or closer apart and by using intermediate sections C and D of correspondingly different sizes, it is possible to provide juvenile vehicle bodies of different length. Thus, the size of the intermediate sections C and D determines the length of the juvenile vehicle body when completed.

Figure 11:
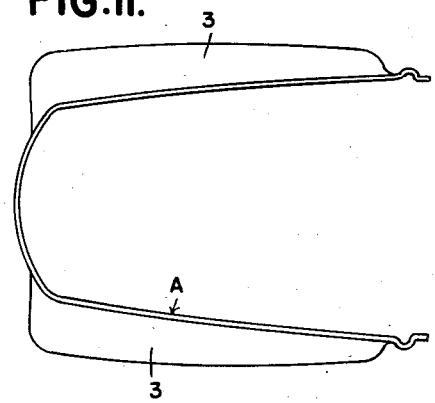
Figure 11 shows a top plan view of one section of the sheet illustrated in Figure 9 after it has been bent into U-form.
Figure 12:
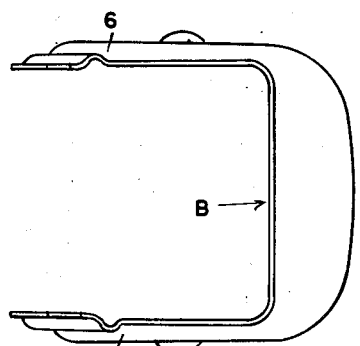
Figure 12 shows a top plan view of one section of the sheet illustrated in Figure 10 after it has been bent into U-form.

In the present instance impressions of the two front end portions A with front fenders 3 are formed from one sheet 20 of metal, and impressions of the two rear end portions B with rear fenders 6 are formed from another sheet 21 of metal. These sheets are then cut along lines 22 and 23, respectively, between the impressions to separate the sheets into sections X—X' and Y—Y'. Each section of the sheet 20 containing an impression of a front end portion A, and each section of the sheet 21 containing an impression of a rear end portion B is then bent into U-form as illustrated in Figures 11 and 12. Following the bending operations, each rear portion B is trimmed at its forward end to provide the edges 24. Each intermediate section C and D is formed as a stamping from a sheet of metal.

To assemble the parts, the front and rear end portions A and B are spaced apart the proper distance according to the over-all length of the vehicle body door, whereupon the separately formed intermediate sections C and D are rigidly secured, preferably by welding, to the adjacent edge portions 15ª and 16ª of the front and rear end portions A and B to form an elongated shell. The hood E is then secured to the front end portion A of the shell, and the seat stampings 9 and 10, as a separate sub-assembly, are secured to the rear end portion B of the shell to complete the assembly.

Thus, from the foregoing it will be apparent that the formation of two front end portions from one sheet of metal and the formation of two rear end portions from another sheet of metal expedites the manufacture of vehicle bodies of the type mentioned and effects a material saving in time and labor.

What I claim as my invention is:

1. The method of making for a juvenile vehicle body of the type in which a child rides a sheet metal end structure having substantially parallel sides provided with outwardly bulging parts constituting fenders, and an intermediate transversely extending portion connecting into said sides at one end thereof, including the steps of subjecting a substantially flat sheet of metal to pressure to form simultaneously therein impressions of said sides, intermediate connecting portion and fenders, cutting the sheet longitudinally adjacent said impressions to separate the section of the sheet containing the impressions from the rest of the sheet, and bending the section so formed to provide the parallel sides and fenders and intermediate transversely extending connecting portion.

2. The method of making for a juvenile vehicle body of the type in which a child rides an elongated sheet metal shell structure having a substantialy U-shaped front end unit, a substantially U-shaped rear end unit and intermediate side panels simulating doors, the sides of each U-shaped end unit having outwardly bulging parts constituting fenders, including the steps of subjecting one substantially flat sheet of metal to pressure to form simultaneously therein impressions of the sides, fenders and intermediate transversely extending connecting portion of the front end unit, cutting the sheet longitudinally adjacent said impressions to separate the section thereof containing the impressions from the rest of the sheet, bending the section so formed into U-configuration to provide the sides, fenders and intermediate transversely extending connecting portion comprising the U-shaped front end unit, subjecting a second substantially flat sheet of metal to pressure to form simultaneously therein impressions of the sides, fenders and intermediate transversely extending connecting portion of the rear end unit, cutting the second mentioned sheet longitudinally adjacent the impressions therein to separate the section thereof containing the impressions from the rest of the sheet, bending the last mentioned section into U-configuration to provide the sides, fenders and intermediate transversely extending portion comprising the U-shaped rear end unit, trimming the sides of the front and rear end units at their free ends to provide edges of predetermined configuration, spacing the front end unit a predetermined distance from and in alignment with the rear end unit with the U's opening toward each other, stamping from separate sheets of metal the intermediate side panels simulating doors, and welding the intermediate side panels to the adjacent edges of said front and rear end units to complete the shell formation.

3. The method of making for a juvenile vehicle body of the type in which a child rides an elongated sheet metal shell structure having a substantially U-shaped front end unit, a substantially U-shaped rear end unit, and intermediate side panels, the sides of each U-shaped end unit having outwardly bulging parts constituting fenders, including the steps of subjecting one substantially flat sheet of metal to pressure to form simultaneously therein longitudinally extending impressions of the sides, fenders and intermediate transversely extending connecting portion of the front end unit, cutting the sheet longitudinally adjacent said impressions to separate the section thereof containing the impressions from the rest of the sheet, bending the section so formed into U-configuration to provide the sides, fenders and intermediate transversely extending connecting portion comprising the U-shaped front end unit, subjecting a second substantially flat sheet of metal to pressure to form simultaneously therein longitudinally extending impressions of the sides, fenders and intermediate transversely extending connecting portion of the rear end unit, cutting the second mentioned sheet longitudinally adjacent the impressions therein to separate the section thereof containing the impressions from the rest of the sheet, bending the last mentioned section into U-configuration to provide the sides, fenders and intermediate transversely extending portion comprising the U-shaped rear end unit, spacing the front end unit a predetermined distance from and in alignment with the rear end unit with the U's opening toward each other, forming from separate sheets of metal the intermediate side panels, and welding the intermediate side panels so formed to the adjacent edges of said front and rear end units to complete the shell formation.

4. The method of making for a juvenile vehicle body of the type in which a child rides an elongated sheet metal shell structure having a substantially U-shaped front end unit, a substantially U-shaped rear end unit and intermediate side panels, including the steps of subjecting one substantially flat sheet of metal to pressure to form simultaneously therein longitudinally extending impressions of the sides and intermediate transversely extending connecting portion of the front end unit, cutting the sheet longitudinally adjacent said impressions to separate the section thereof containing the impressions from the rest of the sheet, bending the section so formed into U-configuration to provide the sides and intermediate transversely extending portion comprising the U-shaped front end unit, subjecting a second substantially flat sheet of metal to pressure to form simultaneously therein longitudinally extending impressions of the sides and intermediate transversely extending connecting portion of the rear end unit, cutting the second mentioned sheet longitudinally adjacent the impressions therein to separate the section thereof containing the impressions from the rest of the sheet, bending the last mentioned section into U-configuration to provide the sides and intermediate transversely extending portion comprising the rear end unit, spacing the front end unit a predetermined distance from and in alignment with the rear end unit with the U's opening toward each other, stamping from separate sheets of metal the intermediate side panels, and rigidly securing the intermediate side panels to the adjacent edges of said front and rear end units to complete the shell formation.

5. The method of making for juvenile vehicle bodies two U-shaped end portions provided at opposite sides thereof with outwardly bulging parts constituting fenders, including the steps of forming simultaneously side by side in a single elongated sheet of metal two longitudinally extending impressions of said end portions and fenders, dividing the sheet longitudinally along a predetermined line between said impressions to provide two separate elongated sections, and bending said elongated sections intermediate their ends into U-configuration to provide the U-shaped end portions having fenders.

6. The method of making juvenile vehicle bodies having U-shaped front end units provided with outwardly bulging parts constituting fenders, U-shaped rear end units having outwardly bulging parts constituting fenders, and intermediate side panel sections simulating doors, including the steps of forming simultaneously side by side in one sheet of metal impressions of two of said front end units provided with fenders, forming simultaneously side by side in a second sheet of metal impressions of two of said rear end units provided with fenders, cutting said sheets longitudinally along predetermined lines between said side by side impressions to divide said sheets into sections, each with an impression of an end unit, bending the sheet sections so formed intermediate their ends to provide the U-shaped end units, spacing the front end units a predetermined distance from and in alignment with the rear end units with the U's opening toward each other, pressing from separate sheets of metal the intermediate side panel sections, and welding the intermediate side panel sections so formed to the adjacent edges of said front and rear end units.

7. The method of making juvenile vehicle bodies having U-shaped front end units, U-shaped rear end units, and intermediate side panel sections, including the steps of forming simultaneously side by side in one sheet of metal longitudinally extending impressions of two of said front end units, forming simultaneously side by side in a second sheet of metal longitudinally extending impressions of two of said rear end units, cutting said sheets longitudinally along predetermined lines between said side by side impressions to divide said sheets into sections, each with an impression of an end unit, bending the sheet sections so formed intermediate their ends to provide the U-shaped end units, spacing the front end units a predetermined distance from and in alignment with the rear end units with the U's opening toward each other, pressing from separate sheets of metal the intermediate side panel sections, and rigidly securing the intermediate side panel sections so formed to the adjacent edges of said front and rear end units.

SAMUEL A. SNELL.